United States Patent Office 2,815,969
Patented Dec. 10, 1957

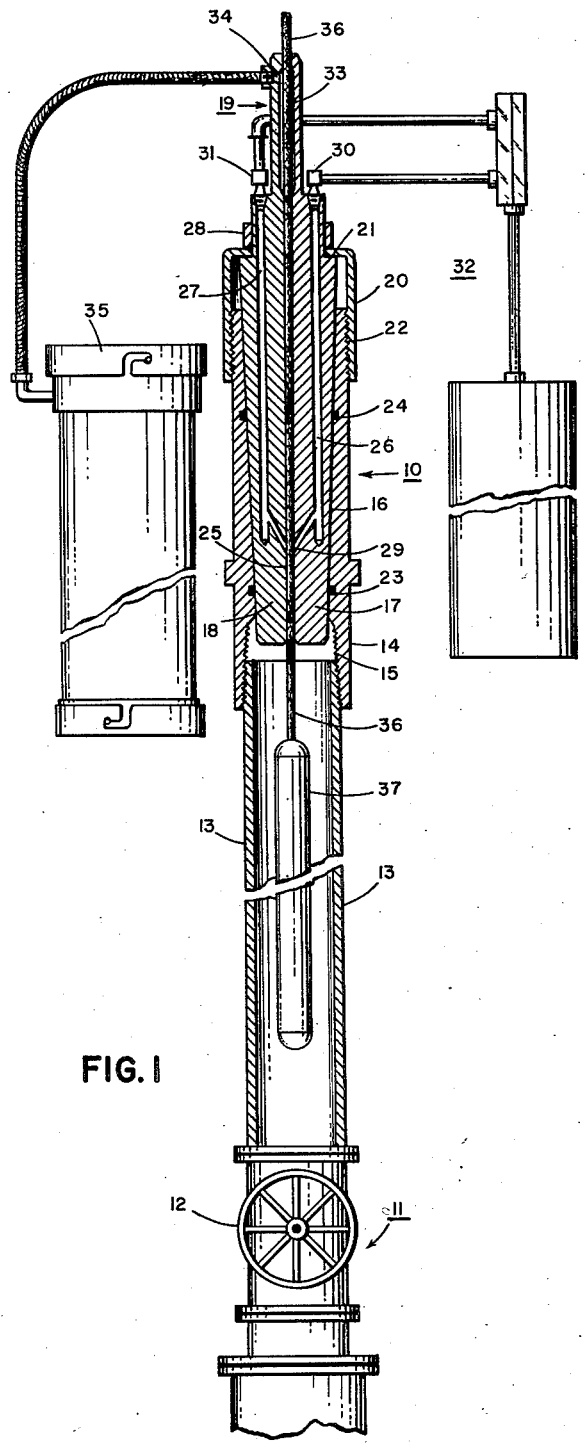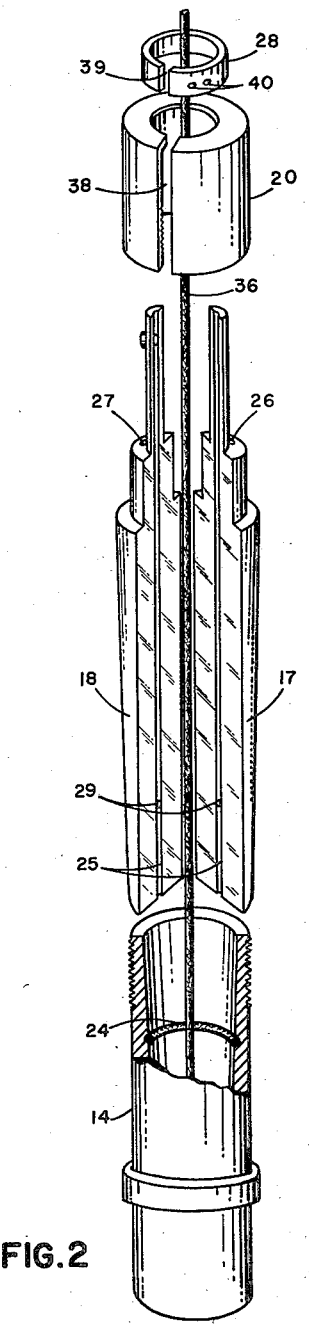
FIG. 1
FIG. 2
INVENTOR.
MAURICE P. LEBOURG
BY
HIS ATTORNEY

2,815,969

LUBRICATING SEAL FOR CABLES

Maurice P. Lebourg, Houston, Tex., assignor, by mesne assignments, to Schlumberger Well Surveying Corporation, Houston, Tex., a corporation of Texas Application May 19, 1954, Serial No. 430,868

2 Claims. (Cl. 286—16)

The present invention relates to lubricators and more particularly to apparatus for maintaining high pressure zones under seal while equipment is being passed through the point of seal.

It is often desirable to pass equipment from a zone of one pressure to a second zone of substantially different pressure. For example, in high pressure oil or gas wells, it may be necessary to lower and raise apparatus in the well by means of cable passing through the well head. It is essential in such operations that the well head remain pressure sealed while the cable is under motion, and yet the cable must be relatively free from constriction. Present lubricators employed at well heads to provide a pressure seal around moving cables are either partially ineffective and tend to restrict the cable movement, thus imposing undue wear on both the cable and the lubricator, or where substantially effective, are extremely complex and clumsy devices imposing loss of time in setups and removals at the well head.

It is a primary object of the present invention to provide new and improved lubricators providing an effective pressure seal about cables and the like passing between zones of different pressures.

Another object of the invention is to provide new and improved lubricators particularly adapted for use at the head of high pressure oil and gas wells, and which supply an effective pressure seal about moving cables and the like.

A further object of the present invention is to provide new and improved lubricators as above, which are rugged and effective, giving full clearance for any apparatus attached to the end of the cable, and which may be quickly and easily set up and removed.

These and other objects of the invention are attained by providing a lubricator assembly which may be readily attached and removed from the equipment separating high and low pressure zones, such as the safety equipment at the head of high pressure wells. More particularly, the lubricator assembly may comprise a plurality of complementary gland sections which when assembled form an elongated truncated cone. A bore slightly larger in diameter than the cable to be pressure sealed is defined by the interface between gland sections and passes between opposite base portions of the assembled gland. One or more channels are provided for connecting said bore with a supply of sealing liquid under pressure.

A sleeve portion having a tapered interior portion to receive snugly the conical gland is adapted to be connected to the well head. When the sleeve is so connected, the apparatus to be passed through the well may be lowered through the sleeve by the supporting cable and into the well head safety equipment. The gland sections are then assembled so the cable passes through the bore, and the sections fitted securely into the sleeve to form a compact gland. Sealing liquid under pressure is introduced via the channel into the bore around the cable.

The well head safety equipment may then be opened and the apparatus attached to the cable moved through the borehole, the sealing liquid in the gland bore providing an effective pressure seal about the moving cable and yet substantially eliminating friction between the gland and the cable. When it is desired to remove the cable-connected apparatus from the well, it may be raised into the well head safety equipment, and the well shut down. The gland sections may then be removed from the sleeve member, and the apparatus withdrawn from the well.

These and other objects of the invention will be more fully understood with reference to the accompanying drawing in which:

Fig. 1 shows a view partially in section of a typical lubricator constructed in accordance with the invention, assembled at a well head; and Fig. 2 is an exploded view of the lubricator shown in Fig. 1, revealing the ease with which the lubricator may be assembled at the well.

In Fig. 1, an assembled lubricator 10 constructed in accordance with the present invention is shown connected to typical well head equipment 11 at the surface of a high pressure well. Well head equipment 11 may comprise, for example, well shut-off means 12 and a riser 13. Sleeve member 14 of lubricator 10 is adapted to be coupled by a fluid-tight seal to well head equipment 11, as for example by means of threads 15. The interior wall 16 of sleeve member 14 is tapered to accommodate cone-shaped semi-circular gland sections 17 and 18 of gland member 19. Gland sections 17 and 18 are secured to sleeve member 14 by means of cap 20, providing a bearing surface against gland sections 17 and 18 and adapted to be tightly fitted to sleeve member 14, as for example, by means of threads 22. The metal-to-metal contact between the interior wall 16 and the outer surface of gland member 19 is made pressure resistant, as for example by means of O-rings 23 and 24 embedded in well 16. Further, the metal-to-metal contact on the interface of the two gland sections 18 and 17 is made pressure resistant due to the forces applied by the cone external pressure. An additional sleeve 28 is adapted to be attached to gland member 19, to assist in the disassembly of lubricator 10, as explained hereinafter.

A bore 25 formed in the interface of gland sections 17 and 18 passes through gland member 19 and is adapted to receive the cable, wire line and the like to be passed through the well head. One or more fluid channels 26 and 27 in gland sections 17 and 18 provide fluid communication between a point 29 in the lower portion of bore 25 and the exterior of lubricator 10. Channels 26 and 27 may be provided with coupling means 30 and 31, for connection to source 32 of sealing liquid under a pressure slightly higher than well pressure. In the upper portion of bore 25, an enlarged portion 33 may be provided, containing a port 34 adapted to be coupled to a container 35 for waste transfer fluid.

In operation after the lubricator 10 is assembled in the manner hereafter described, a cable 36 passing through bore 25 supports in riser 13 any desired well apparatus 37, such as casing perforating means or well logging means for example. Sealing liquid is then injected into bore 25 via channels 26 and 27 and maintained at a pressure slightly greater than well pressure. This liquid provides a fluid-tight seal about cable 36, and thus well shut-off means 12 may be opened and the apparatus 37 passed through the well by means of cable 36. Even when cable 36 is in motion, the sealing liquid in bore 25 will maintain the pressure seal and will prevent undue wear on cable 25 and on gland sections 17 and 18. In order that sealing liquid passing up through bore 25 will not spill from the top of the bore onto the exterior of lubricator 10, sealing liquid reaching the upper portion of the bore will be drained off through port 34 into container 35.

In assembly, sleeve member 14 is coupled to well head equipment 11 and the apparatus 37 passed into equipment 37 such that cable 36 is fully interior of sleeve member 14. As shown in Fig. 2, gland sections 17 and 18 may then be fitted on cable 36 so that said cable fits into the grooves forming bore 25. Gland sections 17 and 18 are dropped snugly into sleeve member 14. Supporting ring 20 is inserted over cable 36 by means of slot 38 extending the length of ring 20. Ring 20 is then made secure to sleeve member 14 forcing gland sections 17 and 18 into pressure resistant contact as a result of the conical tapering thereof. Sleeve 28 having slot 39 therein is then inserted over cable 36 and fastened by means of screws 40 to gland sections 17 and 18. Upon connection of high pressure sealing liquid source 32 to couplings 30 and 31, and of waste transfer fluid container 35 to port 34, the lubricator is ready for operation.

In disassembling, when well apparatus 37 has been returned to riser 13 and the well is shut down by means of valve 12, sealing liquid source 32 and container 35 are removed. A wrench may be fitted to sleeve 39 and upon twisting, ring 20 becomes free from sleeve member 14 pulling gland sections 17 and 18 out of said sleeve member.

Sleeve member 14 may then be removed from well equipment 11, and the entire lubricator is then ready for removal to another location, separated from cable 36 and apparatus 37.

The length to be given bore 25 depends on the pressure anticipated and may be made of greater length for higher pressures. In a typical example, a bore of length 14 inches, having a diameter slightly greater than 3/16 inch to accommodate 3/16 inch steel electrical cable, is adequate for well pressures up to 2500 pounds per square inch, using grade 3 grease, ASTM classification as sealing liquid at 4000 pounds per square inch pressure. All metal components may be manufactured from high grade steel.

Many modifications will occur to those skilled in the art, and thus the scope of the appended claims is not to be limited by the typical embodiment set forth herein.

I claim:

1. In a lubricator for sealing a cable or the like passing into a high pressure zone, a sleeve member including means at one end for connection to an opening in the high pressure zone, said sleeve member having a tapered bore which increases in diameter from said one end to the other end thereof, a gland member including a reduced diameter portion and a frusto-conical portion having a maximum diameter larger than that of said tapered bore, said frusto-conical portion being slidably received in said tapered bore, means defining a longitudinally extending central bore in said gland member for loosely receiving the cable or the like, said gland member being divided along longitudinally extending radial planes into at least two complementary sections to facilitate assembly of said gland member within said sleeve member surrounding the cable or the like, an external threaded section on the outer surface of said other end of said sleeve member, an annular longitudinally split cap member adapted to pass the cable or the like and having an internal portion threadedly engaged with said sleeve member threaded section, abutment means for transmitting motion of said cap member to said gland member as said cap member is tightened onto said sleeve member and for holding said frusto-conical gland portion in wedged engagement with said sleeve member, means defining a fluid channel in said gland member extending from a point on the external surface of said reduced gland portion to said bore in said frusto-conical gland portion, and means for connecting said fluid channel to a source of sealing fluid under pressure.

2. In a lubricator for sealing a cable or the like passing into a high pressure zone, a sleeve member including means at the lower end thereof for connection to an opening in the high pressure zone, said sleeve member having a tapered bore which increases in diameter from the lower end to the upper end thereof, a gland member including a frusto-conical lower portion and a reduced diameter upper portion defining a bearing surface therebetween, said frusto-conical portion being slidably received in said sleeve member and having a maximum upper diameter larger than that of said tapered bore, annular pressure sealing means between said sleeve member and said frusto-conical portion, means defining a longitudinally extending central bore in said gland member for loosely receiving the cable or the like, said gland member being divided along a longitudinally extending diametric plane into a pair of complementary and identical sections to facilitate assembly of said gland member within said sleeve member surrounding the cable or the like, an external threaded section on the upper outer surface of said sleeve member, an annular longitudinally split cap member adapted to pass the cable or the like and having an internal portion threadedly engaged with said sleeve member threaded section, an inwardly extending annular flange on said cap member abutting said bearing surface to transmit downward motion of said cap member to said gland member as said cap member is tightened onto said sleeve member and for holding said frusto-conical gland portion in wedged engagement with said sleeve member, means in at least one of said gland sections defining a fluid channel extending from a point on the external surface of said reduced gland portion to a point in said bore in said frusto-conical gland portion, means for connecting said fluid channel to a source of sealing fluid under pressure, and means connected to said bore in said reduced gland portion for draining excess sealing fluid.

References Cited in the file of this patent

UNITED STATES PATENTS

| | | |
|---|---|---|
| 941,394 | West | Nov. 30, 1909 |
| 2,082,010 | Lane et al. | June 1, 1937 |
| 2,175,648 | Roach | Oct. 10, 1939 |
| 2,670,225 | McKinney | Feb. 23, 1954 |